340-870.12 SR CROSS REFERENCE SEARCH ROOM

XR 2,929,051

March 15, 1960 M. G. PAWLEY 2,929,051

FM/FM – PWM TELEMETERING DECOMMUTATOR

Filed June 29, 1956 2 Sheets-Sheet 1

INVENTOR.
MYRON G PAWLEY
BY
[signature]
[signature]
ATTORNEYS

INVENTOR.
MYRON G PAWLEY
BY
[signature]
[signature]
ATTORNEYS

United States Patent Office 2,929,051
Patented Mar. 15, 1960

2,929,051

FM/FM—PWM TELEMETERING DECOMMUTATOR

Myron G. Pawley, Riverside, Calif., assignor to the United States of America as represented by the Secretary of the Navy Application June 29, 1956, Serial No. 595,027
9 Claims. (Cl. 340—182)
(Granted under Title 35, U.S. Code (1952), sec. 266)

Figure 1:
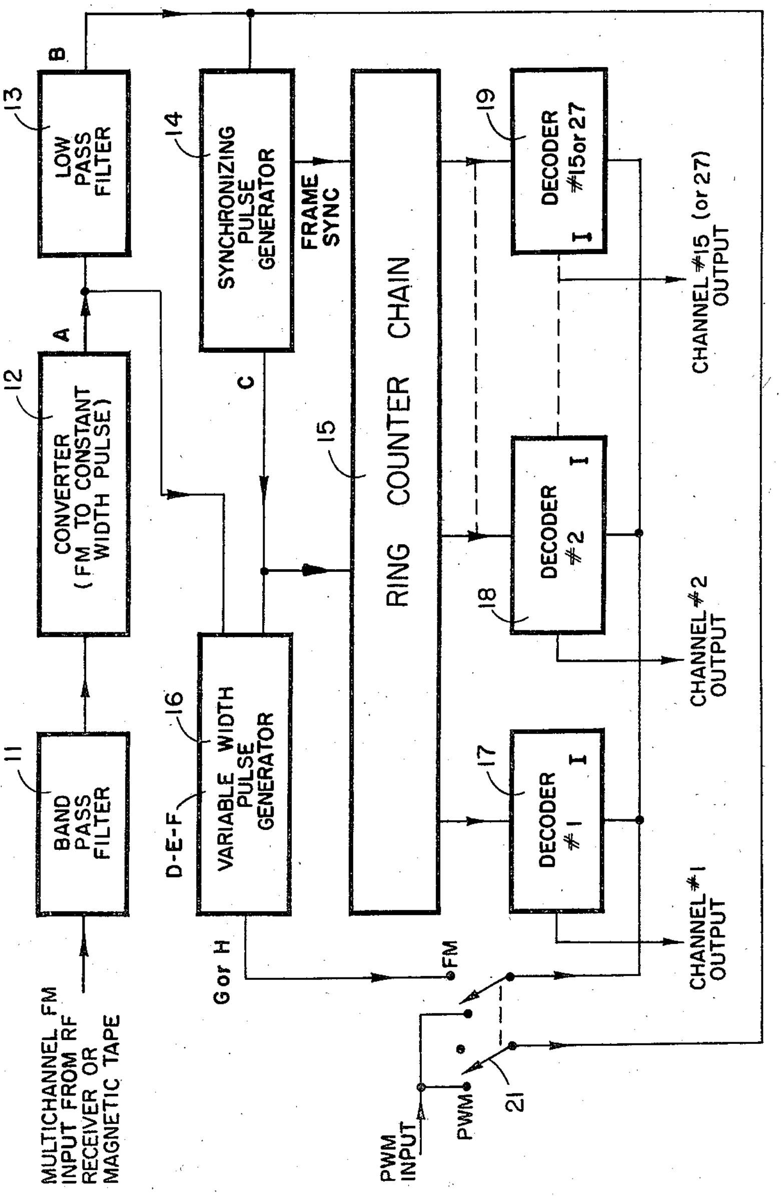

The invention described herein may be manufactured and used by or for the Government of the United States of America for governmental purposes without the payment of any royalties thereon or therefor.

This invention relates to telemetering systems and more particularly to an improved telemetering decommutator for separating the commutated channels in either an FM/FM or in a PWM telemetering system.

Two telemetering systems widely used in testing guided missiles are referred to as FM/FM, and PWM (or PDM). In the former system the intelligence to be transmitted frequency modulates a number of subcarrier oscillators and the composite group of subcarrier signals in turn frequency modulates an RF transmitter. At the ground receiving station the several frequency-modulated subcarrier signals are separated through band-pass filters, then passed through subcarrier discriminators and into recording channels. This is an example of a frequency division telemetering system.

In order to increase the intelligence handling capacity of the FM/FM telemetering system it is common practice to add "commutators" to one or more of the subcarrier channels. The commutator is a multicontact rotating switch. A number of channels of intelligence to be transmitted remotely are connected to the stationary contacts of the switch and a motor-driven rotating switch arm provides the output terminal of the commutator. The output consists of a repeating sequence of pulse amplitude modulated (PAM) signals. The spacing of the stationary contacts is usually sufficient to provide equal "on" and "off" times for the successive channel signals. The pulse sequence is applied to one of the voltage-controlled subcarrier oscillators the frequency of which thereby varies in accordance with the instantaneous voltage applied to the oscillator. For synchronization of successive "frames" of channel pulses two or more of the stationary contacts are frequently strapped together to provide a longer duration frame synchronizing pulse which can be recognized at the ground receiving station by suitable circuitry to be described later.

Another widely used telemetering system, one in which all the transmitted intelligence is commutated, is referred to as PWM (or, more recently, PDM). These symbols stand for pulse width modulation and pulse duration modulation respectively. This mode of modulation is commonly applied directly to the frequency modulator of an RF transmitter rather than first to a subcarrier oscillator, although the latter form of modulation is feasible. In the PWM process a pulse amplitude modulated (PAM) signal is first produced, as described above, and then the signal passes to a converter, sometimes referred to as a keyer, which changes the signal from PAM to PWM form. The repeating sequence of amplitude modulated pulses is thus converted to a corresponding sequence of width (or duration) modulated pulses.

The application of PAM in the FM/FM system and the direct application of PWM to the frequency modulator of an RF transmitter both provide examples of time division telemetering systems. The PWM system, as well as the PAM, are commutated systems requiring decommutators to separate and decode the channels at the ground receiving station for monitoring and/or recording.

Advantages of the decommutator of this invention over former decommutators may best be pointed out by first reviewing some of the limitations of other decommutators.

Prior systems of decommutation have relied essentially on analog circuitry for decoding or conversion of commutated PAM or PWM channel signals to varying D.C. form for monitoring and/or recording. Furthermore, these systems in general have not been flexible in ability to efficiently handle PWM as well as PAM commutated data. Also, the channel data in these systems is not generally available in a form suitable for accurate conversion when desired to digital form.

As commonly employed, conversion of the commutated signal is accomplished by demodulation of the received signal in a subcarrier FM discriminator, an analog device subject to zero level and sensitivity drifts leading to inaccuracies. The channels are then separated and the channel signals converted to varying D.C. form by suitable electronic switching and decoding circuitry similar to that utilized in connection with this invention. It should be noted that no matter how stable and precise this switching and decoding circuitry is, it does not compensate for "analog" drifts in the demodulation process as described above.

The principal advantages of the decommutator of this invention include the utilization of precise digital counting techniques in accurately converting FM/FM commutated (PAM) signals to variable width pulses whose instantaneous widths correspond to the channel subcarrier frequency at the instant of conversion. This process changes the channel data to a form which corresponds to that of signals from a PWM system. Hence a single type of PWM to D.C. converter can be utilized to convert either a PWM signal or the variable width pulse derived from the FM/FM commutated (PAM) signal (as described in this invention) to varying D.C. form for channel monitoring and/or recording. This results in overall simplification and stabilization of equipment since there is only one D.C. amplifier or inherently unstable analog circuit in the channel demodulation and decoding chain. This single D.C. channel signal amplifier may be chopper-stabilized if high stability is required. Another advantage of this invention will be seen to be its ready adaptation to digitalization of the variable width pulse output derived for each of the standard telemetering systems involved.

The principle of operation of the telemetering decommutator of the present invention may be briefly and generally described as follows. With conventional circuitry a band pass filter separates one of the commutated subcarriers from the other subcarriers received by the FM/FM telemetering receiver, or from a magnetically recorded tape of a received signal. The leading edges of the commutated channel pulses and the frame synchronizing pulses are separated by conventional telemetering techniques. A ring counter chain is utilized in a conventional manner to obtain pulses on separate output terminals which mark the beginning of the corresponding channel intervals. The pulses are utilized to "gate" the separate channel signals to corresponding decoders which convert the channel signals to varying D.C. form for monitoring and/or recording. These functions are all performed by conventional techniques, not the subject of this invention. The novel feature of this invention is the means by which the instantaneous frequency of the commutated subcarrier during any commutator channel contact "dwell" period is converted to a correspondingly varying duration-modulated pulse. This channel pulse width modulated signal, which is similar to the channel signal developed in a PWM system, provides the input to the aforementioned channel decoder. To convert the channel intelligence which is measured by the frequency of the subcarrier during the channel interval to a variable width pulse a digital cycle-counting technique is employed whereby a fixed number of cycles of the subcarrier are counted during the commutator channel dwell period. A corresponding channel pulse is generated which starts at the beginning of the counting period and stops at the end of this period. The pulse width modulated channel signal therefore carries the telemetered channel intelligence with the pulse width varying linearly with the period of the subcarrier frequency.

One preferred embodiment of the present invention includes a band pass filter which separates one of the commutated subcarriers from the other subcarriers received by the telemetering receiver or recorded on magnetic tape. The output from the band pass filter passes to a converter where the sine wave subcarrier signal is converted to a corresponding sequence of pulses of constant duration which in turn is passed through a low pass filter whose output is a D.C. voltage varying linearly with the signal frequency during the pulses. The output of the low pass filter goes to a synchronizing pulse generator where channel and frame synchronizing pulses are generated. These operations are performed with conventional telemetering components including band pass filters, subcarrier converters or discriminators and synchronizing pulse generators. In the conventional FM/FM system the band pass filter, subcarrier converter and low pass filter are usually mounted on a single chassis referred to as the subcarrier discriminator. In the conventional decommutator the PAM output from the discriminator passes to channel gates which are switched by a ring counter chain distributing the separate channel signals to the appropriate channel decoders. Errors in the demodulation process are thus passed along to the channel decoders. The demodulation technique is different in this invention. The channel synchronizing pulses are applied to a variable width pulse generator which also receives the unfiltered pulse output from the converter, consisting of a pulse for each cycle of the subcarrier frequency. In the variable width pulse generator a delay pulse and suitable pulse selecting and counting circuitry permit the counting of exactly 16 clean pulses from the converter during a period well removed from the transiently disturbed periods at the beginning and end of the channel dwell period, and provide an output pulse whose time duration corresponds to the period for exactly 16 subcarrier cycles and is therefore a measure of the telemetered data being commutated at that instant. A ring counter-chain also receives the channel synchronizing pulse and a frame synchronizing pulse for stepping pulses around the counter-chain and for recycling to provide proper sequential gating of the commutated channel samples from the variable width pulse generator into correspondingly numbered channel decoders. If desired, the variable width pulse which is proportional to the period of the subcarrier frequency, and is a measure of the channel data intelligence, may be converted in the channel decoder to a correspondingly varying D.C. voltage which is linear with subcarrier frequency. When the decommutator is used to separate the channels in the PWM telemetering system the PWM signal passes directly to the synchronizing pulse generator and to the ring counter-chain and decoders.

One object of the present invention is to provide a telemetering decommutator which accurately converts a fixed number of cycles of the subcarrier frequency during channel contact dwell periods to a like number of pulses which are counted by digital technique to derive a variable width pulse proportional to the average period of the subcarrier frequency during the commutator channel dwell period.

Still another object of the present invention is to provide a telemetering decommutator which is particularly adapted to separate the commutated channels of either an FM/FM or a PWM telemetering system.

Still another object of the present invention is to provide a telemetering decommutator which develops channel signals which may be readily and accurately converted to digital form.

Figure 2:
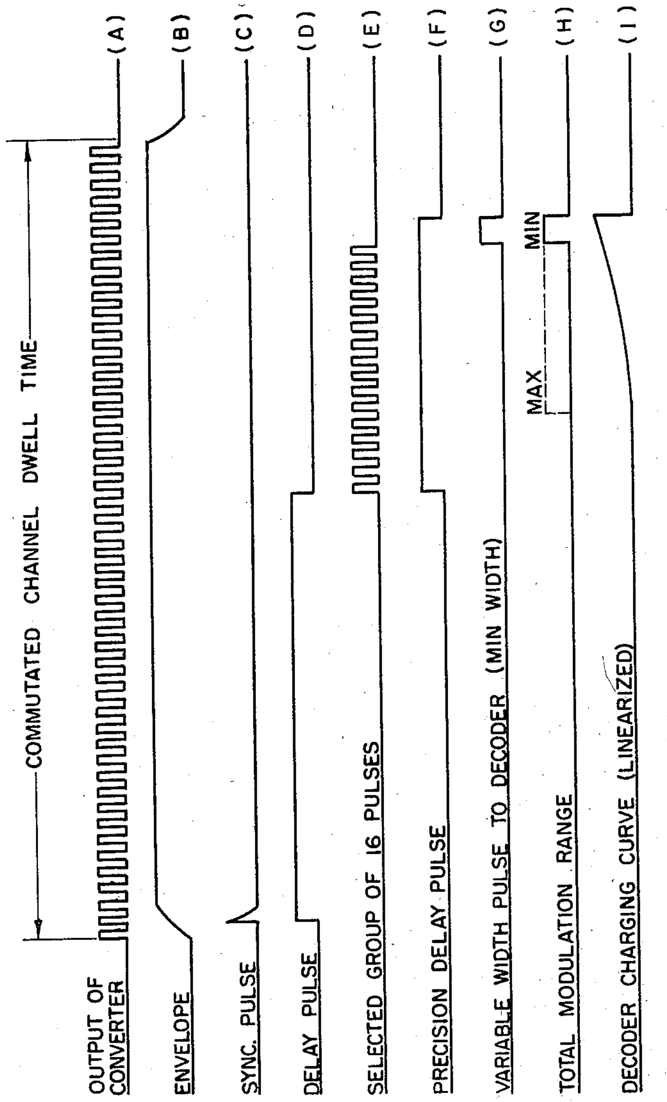

Other objects and many of the attendant advantages of this invention will be readily appreciated as the same becomes better understood by reference to the following detailed description when considered in connection with the accompanying drawings wherein:

Fig. 1 is a block diagram illustrating one preferred embodiment of the present invention; and Fig. 2 is a waveform diagram illustrating the waveforms of signals in different portions of the circuit illustrated in Fig. 1.

Referring now to the drawings in detail and more particularly to the block diagram of Fig. 1, the multichannel FM input from an RF receiver or a corresponding signal recorded on magnetic tape is applied to a band pass filter 11. This composite signal may include a number of frequency modulated subcarriers one or more of which carries a PAM commutated signal so that a number of additional data inputs may be accommodated at the transmitting end.

The desired commutated subcarrier is separated from the other subcarriers by the band pass filter 11 and passes to a converter where the sequence of subcarrier sine voltage waves corresponding to each of the on periods or contact dwell periods of the commutator is caused to generate a corresponding sequence of square waves, one pulse for each subcarrier cycle with constant duration irrespective of the instantaneous subcarrier frequency. The constant duration of these pulses is taken equal to one-half the period of the subcarrier center frequency.

The output of the converter 12 consisting of a sequence of constant duration pulses, as illustrated in Fig. 2A, is passed through the low pass filter 13 whose output will be a D.C. voltage varying linearly with the frequency of the pulses as illustrated in Fig. 2B.

If desired, the output from the low pass filter 13 may be connected through an impedance matching amplifier (not shown) for direct recording of the commutated signals with unseparated channels. These techniques are well-known to the telemetering art but this recording method results in recorded signals which are very difficult to analyse.

If the dwell periods for the successive commutator contacts were exactly equal it would be a relatively simple matter to use an electronic scaling circuit to count the number of pulses in each data sample as a measure of the telemeter data or to integrate the sequence of constant width pulses over the uniform dwell periods as a measure of the transmitted data. Unfortunately the successive dwell periods are not of constant duration for the speed of mechanical commutation may vary considerably during operation. In order to overcome this difficulty and at the same time avoid the instability problems attendant to D.C. amplifiers and other analog approaches to the problem, the synchronizing pulse generator 14 which receives the output from the low pass filter 13 and generates both frame synchronizing pulses and channel synchronizing pulses in a conventional manner for application to the ring counter-chain 15 also supplies a channel synchronizing pulse to a variable width pulse generator 16 which accepts the sequence of pulses occurring during the successive commutator channel dwell periods as shown in the converter output waveform of Fig. 2A.

The variable width pulse generator 16 receives the separated channel synchronizing pulse of Fig. 2C and generates a delayed pulse as illustrated in Fig. 2D to initiate suitable pulse selecting and counting circuitry which permits the counting of an exact number of pulses, for example exactly 16 clean pulses, during a quiescent period well removed from the transiently disturbed periods at the beginning and end of the channel dwell period as illustrated in Fig. 2E. The requirements of stability and accuracy of delay of the pulse in Fig. 2D are not critical.

The time duration required for the selected 16 pulses may be taken as a measure of the corresponding sample of telemetered data, since it is a measure of the period of the channel subcarrier frequency. It is better, however, to subtract this time duration from a precision delay pulse such as that shown in Fig. 2F in order to obtain a greater percentage variation in the modulated pulse width as indicated in Figs. 2G and 2H. By this process each commutated channel sample of frequency modulated subcarrier signal gives rise to a pulse output from generator 16 whose duration is a measure of the telemetered data being commutated at that instant.

One apparatus for performing the functions of generators 16 and providing a pulse of variable time duration, or if desired a digital output, corresponding to the FM information in the particular channel is disclosed in the co-pending application of John O. Dick for "An Electronic FM/FM to Analog or Digital Converter," Serial No. 595,028 filed June 29, 1956, which issued November 25, 1958, as Patent Number 2,862,185.

The synchronizing pulse generator 14 integrates the signal from the low pass filter 13 to obtain the frame synchronizing pulses and channel synchronizing pulses and also generates false synchronizing pulses to replace those lost by interfering noise. A typical synchronizing pulse is illustrated in Fig. 2C. This technique is well-known to the telemetering art.

The channel synchronizing pulses are required for stepping pulses around the ring counter-chain 15, and the frame synchronizing pulse is required for recycling the counter-chain 15 to correspond with the cycling of the commutator at the transmitter. The function of the counter-chain 15 is to provide the proper sequential gating of the commutated channel samples into the correspondingly numbered channel decoders such as those indicated by the numerals 17, 18, and 19. These operations are also well-known to the art.

In the decoder such as 19 the variable width pulse which is a measure of the channel data sample is converted to correspondingly varying D.C. voltage. The decoder capacitor charging curve as indicated in Fig. 2I is modified to give a linear response of D.C. output with respect to the varying frequency input. With a linear charging curve the response would be proportional to period rather than frequency of the subcarrier. Pulse stretching circuitry may also be utilized in the channel decoder to smooth out the response between successive channel samples. The operation of the decoder is not affected adversely by variations in commutator speed or contact dwell time at the transmitter. The decoders include highly stable computer type D.C. output amplifiers to provide adequate power with good regulation for simultaneous driving of pen and photographic recorders (not shown).

When the decommutator of the present invention is used to separate the channels in a PWM telemetering system the switch 21 at the left of the block diagram of Fig. 1 is thrown to the PWM position, since the variable width pulse generator is not required in this case, the signal already consisting of a repeating sequence of variable width modulated pulses. Therefore, the PWM signal passes directly to the synchronizing pulse generator 14 and to the ring counter-chain 15 and decoders 17, 18, and 19 which function in the same manner as described above for the PAM mode of operation except that in this case the decoder capacitor charging curve is made linear.

While other types of counter-chains such as vacuum or gas tube, or transistor, may be utilized, the counter-chain 15 may be a magnetic ring counter-chain such as that disclosed in the co-pending application of Myron G. Pawley for Multiplex Communication System, Serial No. 464,662, filed October 25, 1954, which issued December 10, 1957, as Patent No. 2,816,169.

The development of a pulse width modulated signal corresponding to the intelligence in each channel of either a commutated FM/FM or PWM system constitutes another important advantage of the decommutator of the present invention, since it is relatively simple to accurately convert a pulse width modulated signal to digital form by counting gated clock pulses for the period of the signal. This is a common technique for accurately measuring time intervals.

Obviously many modifications and variations of the present invention are possible in the light of the above teachings. It is therefor to be understood that within the scope of the appended claims the invention may be practiced otherwise than as specifically described.

What is claimed is:

1. A telemetering decommutator comprising means for sampling the subcarrier frequency during each contact dwell period of a commutated FM/FM signal and deriving a series of constant amplitude and variable width pulses whose time duration is dependent on said frequency and is a measure of the telemetered data at that instant, and means for sequentially gating said pulses into a plurality of corresponding output channels.

2. A telemetering decommutator comprising means for sampling the subcarrier frequency during a quiescent portion of each contact dwell period of a commutated FM/FM signal and deriving a series of constant amplitude and variable width pulses whose time duration is dependent on said frequency and is a measure of the telemetered data at that instant, and means for sequentially gating said pulses into a plurality of corresponding output channels.

3. A telemetering decommutator comprising means for sampling the subcarrier frequency during each contact dwell period of a commutated FM/FM signal and by digital counting of a predetermined number of cycles of said subcarrier frequency deriving a series of constant amplitude and variable width pulses whose time duration is dependent on said frequency and is a measure of the telemetered data at that instant, and means for sequentially gating said pulses into a plurality of corresponding output channels.

4. A telemetering decommutator comprising a plurality of decoders, a counter-chain associated with said decoders, a synchronizing pulse generator associated with said counter-chain, means for converting a commutated FM/FM signal to a series of constant amplitude and variable width pulses derived by digital counting of a predetermined number of cycles of the subcarrier frequency during successive commutator channel contact dwell periods and applying said variable width pulses to said decoders, said synchronizing pulse generator being operatively connected to said FM/FM signal and adapted to generate channel synchronizing pulses for stepping pulses around said counter-chain and frame synchronizing pulses for recycling the counter-chain for proper sequential gating of said variable width pulses into corresponding channel decoders.

5. A telemetering decommutator comprising a plurality of decoders, a counterchain associated with said decoders, a synchronizing pulse generator associated with said counter-chain, means for converting a commutated FM/FM signal to a series of constant amplitude and variable width pulses derived by digital counting of a predetermined number of cycles of the subcarrier frequency during a quiescent portion of successive commutator channel contact dwell periods and applying said variable width pulses to said decoders, said synchronizing pulse generator being operatively connected to said FM/FM signal and adapted to generate channel synchronizing pulses for stepping pulses around said counter-chain and frame synchronizing pulses for recycling the counter-chain for proper sequential gating of said variable width pulses into corresponding channel decoders.

6. A decommutator as set forth in claim 4 wherein said means for providing a series of variable width pulses comprises means for converting a commutated FM sine wave signal into corresponding constant width pulses and means associated with said synchronizing pulse generator and converter for generating a pulse whose time duration is a measure of the telemetered data being commutated at that instant.

7. A decommutator as set forth in claim 4 wherein said means for providing a series of variable width pulses comprises means for converting a commutated FM sine wave signal into corresponding constant width pulses and means associated with said synchronizing pulse generator and converter for generating a pulse whose time duration is a measure of the telemetered data being commutated at that instant, and the envelope of said FM/FM signal is applied to said synchronizing pulse generator.

8. A telemetering decommutator for separating and decoding commutated channels in an FM/FM telemetering system comprising a band pass filter, a converter adapted to convert the FM subcarrier sine wave signal into a corresponding sequence of pulses of constant duration, a low pass filter associated with said converter and adapted to provide an output consisting of a D.C. voltage varying linearly with subcarrier frequency, a synchronizing pulse generator associated with said low pass filter and adapted to generate both frame synchronizing pulses and channel synchronizing pulses, a variable width pulse generator receiving the output of said converter and pulses from said synchronizing pulse generator and providing an output pulse derived by digital counting of a predetermined number of cycles of the subcarrier frequency during successive commutator contact dwell periods, said output pulse having a duration which is a measure of the telemetered data being commutated at that instant, a ring counter-chain adapted to receive the frame and channel synchronizing pulses from said synchronizing pulse generator, and a plurality of decoders adapted to receive the signals from said variable width pulse generator, said decoders being associated with said counter-chain whereby the commutated channel samples are sequentially gated into corresponding channel decoders.

9. A telemetering decommutator for separating and decoding commutated channels in either an FM/FM or in a PWM telemetering system comprising a band pass filter, a converter adapted to convert the FM subcarrier sine wave signal into a corresponding sequence of pulses of constant duration, a low pass filter associated with said converter and adapted to provide an output consisting of a D.C. voltage varying linearly with subcarrier frequency, a synchronizing pulse generator associated with said low pass filter and adapted to generate both frame synchronizing pulses and channel synchronizing pulses, a variable width pulse generator receiving the output of said converter and pulses from said synchronizing pulse generator and providing an output pulse derived by digital counting of a predetermined number of cycles of the subcarrier frequency during successive commutator contact dwell periods, said output pulse having a duration which is a measure of the telemetered data being commutated at that instant, a ring counter-chain adapted to receive the frame and channel synchronizing pulses from said synchronizing pulse generator, a plurality of decoders adapted to receive the signals from said variable width pulse generator, said decoders being associated with said counter-chain whereby the commutated channel samples are sequentially gated into corresponding channel decoders, and means for selectively switching the input to said decoders and said synchronizing pulse generator from said digitally derived variable width pulses and said D.C. voltage to a direct PWM input.

References Cited in the file of this patent

UNITED STATES PATENTS

| | | |
|---|---|---|
| 2,070,774 | Barthelmy | Feb. 16, 1937 |
| 2,399,135 | Miller et al. | Apr. 23, 1946 |
| 2,405,597 | Miller | Aug. 13, 1946 |
| 2,537,056 | Hoeppner | Jan. 9, 1951 |
| 2,640,164 | Giel | May 26, 1953 |
| 2,656,524 | Gridley | Oct. 20, 1953 |
| 2,705,795 | Fisk | Apr. 5, 1955 |
| 2,712,128 | Woodruff | June 28, 1955 |
| 2,713,677 | Scott et al. | July 19, 1955 |
| 2,720,584 | Sloughter | Oct. 11, 1955 |

OTHER REFERENCES

Publication: FM/FM Telemetering System, "Instruments," volume 23, July 1950.

Book by M. Nichols et al.: "Radio Telemetry," John Wiley and Sons, New York, 1956, 2nd ed. (pp. 265–267 and 336–337 relied on).